United States Patent [19]

Gogorishvili et al.

[11] 3,883,908

[45] May 20, 1975

[54] METHOD FOR PREPARING COPPER TOGETHER WITH MANGANESE SULPHATE

[76] Inventors: Platon Vladimirovich Gogorishvili, ulitsa Barnova, 124 a, kv. 6; Tengiz Pavlovich Geleishvili, ulitsa Oktyabrskaya, 34, korpus 18, kv. 2; Nina Porfirievna Zarkua, ulitsa Pekina, 11, kv. 21, all of Tbilisi; Georgy Alexeevich Nikolishvili, ulitsa Leonidze, 12, kv. 85, Rustavi; Rusudan Georgievna Dundua, 1 V tupik Barnova, 16, Tbilisi; Nadezhda Georgievna Svintidze, GSSR, Bolnissky raion, selo Kazreti, Madneulsky gornoobogatitelny kombinat; Nina Ivanovna Onuchkina, ulitsa Onezhskaya, 4, kv. 46, both of Leningrad; Gaioz Grigorievich Kasradze, ulitsa Saburtalinskaya, 39, kv. 31; Genrikh Moiseevich Kuperman, ulitsa Sovetskaya 66, both of Tbilisi, all of U.S.S.R.

[22] Filed: Aug. 24, 1973

[21] Appl. No.: 391,250

[52] U.S. Cl. .................. 75/108; 75/115; 75/117; 423/37; 423/27; 423/41; 423/42; 423/45; 423/49; 423/50; 423/52
[51] Int. Cl.. C22b 15/12; C01g 45/00; C01g 45/10
[58] Field of Search ............ 423/52, 27, 41, 42, 45, 423/544, 549, 50, 49, 37; 75/115, 108

[56] References Cited
UNITED STATES PATENTS 3,510,259   5/1970   Everett .......................... 423/544 X

FOREIGN PATENTS OR APPLICATIONS 222,638   6/1959   Australia ............................ 75/115

Primary Examiner—Herbert T. Carter
Attorney, Agent, or Firm—Holman & Stern

[57] ABSTRACT

The method for preparing copper and manganese sulphate in a single process from chalcopyrite concentrate and a manganese-containing raw material, selected from the group consisting of manganese ore and manganese flotation concentrate, resides in their being mutual suspended in water with a subsequent oxidative leaching at a temperature of 165°–185°C and a partial pressure of oxygen of 2.5–15 atm, with the formation of the reaction mixture containing an aqueous solution of sulphates of copper and manganese, separation of the said solution from the reaction mixture, precipitation of copper from the solution by reducing it with hydrogen from copper sulphate at a temperature of 160°–180°C and a pressure of 30–40 atm, separation of copper from the solution of manganese sulphate and sulphuric acid which is formed as a result of copper reduction, purification of the solution from admixtures of copper by manganese sulphide, separation of the formed precipitate of copper sulphide, which is returned to the process at the stage of oxidative leaching, neutralization of sulphuric acid with the said manganese-containing raw material, isolation of the solution of manganese sulphate and its evaporation and eventual crystallization.

4 Claims, No Drawings

METHOD FOR PREPARING COPPER TOGETHER WITH MANGANESE SULPHATE

This invention relates to the method for preparing copper together with manganese sulphate.

Said products are widely used in various branches of modern industry. Thus, copper having high electric conductivity is used in the manufacture of conductors of electricity, and when in combination with other metals, it is used as special alloys.

Manganese sulphate is a valuable raw material for the manufacture of manganese compounds, for example, manganese dioxide, which is widely used in the iron-and-steel industry and in electric engineering.

Many methods for preparing copper and manganese sulphate are known in the prior art.

A method for preparing manganese sulphate from lean manganese ores by roasting them in an atmosphere of sulphuric anhydride is also known. The roasted ore is leached with water in order to prepare solution of manganese sulphate.

The disadvantage of this method is the low yield of the end product and the complicated process of preparation.

Another method for preparing manganese sulphate is also known in which manganese ore is roasted in order to transfer manganese oxides which are sparingly soluble in sulphuric acid into readily soluble manganese compounds. The roasted ore is then leached with a solution of sulphuric acid to prepare a solution of manganese sulphate.

The disadvantage of this method is also the low yield of the end product.

One of the methods used for preparing copper is the ammonia method, in which chalcopyrite concentrate in an aqueous solution of ammonia is leached at elevated temperatures and pressures to prepare copper and ammonium sulphate.

The disadvantage of the method is that ammonia is a rather expensive raw material, while ammonium sulphate which is produced as a by-product has but limited use. Moreover, the decomposition of ammonia complexes of copper decreases the yield of the end product, as a result the process on the whole is not very efficient from the economical standpoint.

Another method for preparing copper is known in which chalcopyrite concentrate in the form of an aqueous suspension is leached at elevated temperatures and pressures in order to prepare the reaction mixture which alongside with the copper sulphate also contains sulphuric acid, which is neutralized with calcium oxide. After the neutralization, copper sulphate is isolated in the pure state and copper is recovered from it by electrolysis.

In the neutralization process, calcium sulphate is formed, that is the sulphide sulphur of the starting chalcopyrite is utilized disadvantageously. Moreover, the process of the formation of calcium sulphate proper interferes with the normal course of the process since the volume of the solid phase in the reaction zone increases.

Until the present time, processes for mutual production of copper and manganese sulphate were not known.

The object of the invention is to provide a method for preparing copper together with manganese sulphate.

In accordance with this and other objects, the invention consists in that chalcopyrite concentrate together with manganese ore or manganese flotation concentrate is suspended in water, leached at a temperature of 165°–185°C and a partial pressure of oxygen of from 2.5 – 15 atm with the formation of the reaction mixture containing an aqueous solution of copper sulphate and manganese sulphate, and while the said solution is isolated from the reaction mixture, the copper is precipitated from the solution by reducing it from copper sulphate with hydrogen at a temperature of 160° – 180°C and a pressure of 30–40 atm., copper is separated from the solution of manganese sulphate and sulphuric acid, which is formed in the reduction of copper, whereupon the solution is cleaned from copper admixtures by adding manganese sulphide, the obtained precipitate of copper sulphide is separated and transferred to the stage of oxidative leaching, sulphuric acid is neutralized by adding manganese ore or manganese flotation concentrate to the filtrate, the solution of manganese sulphate is separated, evaporated, and the manganese sulphate is recovered from the solution by crystallization.

Under these conditions, the sulphur sulphide of the chalcopyrite is oxidized to the sulphate form. As a result, copper ions and sulphate ions are formed in the solution, and copper sulphate is produced.

The excess sulphide sulphur (as compared with the theoretical quantities of sulphur required to transfer the copper of chalcopyrite into the sulphate form) leads to the formation of $FeSO_4$ and sulphuric acid. If the manganese oxide compounds are used in the process as the manganese-containing raw material, the ferrosulphate is oxidized in the presence of sulphuric acid to $Fe_2(SO_4)_3$ and reduces the manganese dioxide into manganese oxide which reacts with sulphuric acid to form manganese sulphate. If a manganese carbonate raw material is used as the manganese-containing compounds, manganese sulphate is produced too, but as a result of the direct interaction between sulphuric acid and the manganese carbonate contained in the said raw materials, while $FeSO_4$ contained in the solution, under the action of oxygen and in the presence of sulphuric acid, is oxidized to $Fe_2(SO_4)_3$.

In both cases, irrespective of the particular manganese raw material used, favourable conditions for the hydrolysis of $Fe_2(SO_4)_3$ are produced, in which $Fe_2O_3$ is precipitated, and conditions are provided for preparing a sufficiently pure solution of the sulphates of copper and manganese, from which copper is precipitated by reduction with hydrogen from copper sulphate under the same conditions, with subsequent processing of the solution in order to prepare manganese sulphate.

In order to ensure the preparation of manganese sulphate at a rather high yield, it is recommended in cases where oxidic manganese ores or oxidic flotation concentrates are used to roast them before the neutralization of sulphuric acid.

For a better oxidation of $FeSO_4$ to $Fe_2(SO_4)_3$ with subsequent hydrolysis of this compound being formed on account of the iron contained in the manganese raw material in the process of neutralization with sulphuric acid, it is recommended that the said neutralization be carried out at a temperature of about 80°C with a continuous sparging of air through the reaction mixture.

The proposed method ensures the preparation of copper together with manganese sulphate with a copper yield of 96–98 percent and a recovery of manganese of 96 percent, with the end products being sufficiently pure, although the starting material may be low-grade manganese ores and flotation concentrates that are not widely used in industry. Moreover, the proposed method makes it possible to more rationally utilize the excess sulphur of chalcopyrite as compared with the known methods for preparing copper in which sulphur was utilized for the production of calcium sulphate, or ammonium sulphate, which are only used to a limited extent, while in the proposed method sulphur is an active agent which promotes practically the complete leaching of manganese.

The proposed method is effected as follows:

Chalcopyrite concentrate and manganese-containing raw material (carbonate or oxidic compounds, or mixtures thereof) are ground in a ball mill with water. The starting components, i.e., copper concentrate, manganese-containing materials and water, are taken in the ratio of 1:0.4–3:5–10, respectively. The prepared suspension is delivered into an autoclave whereby at a temperature of 165°–185°C, in an atmosphere of oxygen of the air, and at a partial oxygen pressure of 2.5–15 atm, the oxidative leaching is effected. The resultant reaction mixture contains the solution of sulphates of copper and manganese, and also a solid phase, which is separated from the solution by filtration. The filtrate is delivered into an autoclave where at a temperature of 160°–180°C and a pressure of 30–40 atm copper is precipitated by reduction with hydrogen from copper sulphate. The reaction mixture is filtered to separate copper, while the solution containing copper admixtures is purified by adding manganese sulphide to form copper sulphide which is separated from the solution by another filtration and is delivered to the stage of oxidative leaching. The manganese-containing raw material is added to the filtrate in order to neutralize the sulphuric acid. The neutralization process is carried out at a temperature of 80°–90°C with a simultaneous passing of air through the reaction mixture. Then, the precipitate is separated by filtration, the solution of manganese sulphate is evaporated and crystallized. The solution of manganese sulphate can also be used in the liquid form, for example, for preparing manganese dioxide by electrolysis or some other methods, and also for preparing other salts of manganese, for which purpose the proposed process can be continued in order to obtain the said products by any known technique.

For a better understanding of the invention, it will be illustrated by the following examples of its practical embodiment.

(The proposed process can be run on both intermittent and continuous principles).

EXAMPLE 1

Chalcopyrite concentrate containing 24.4 percent of copper, 36.2 percent sulphur, and also manganese ore, containing 39.8 percent of manganese, and water are treated in a ball mill in order to reduce the particle size to 44 mcm. The components are taken in the following ratio (by weight): copper concentrate: manganese oxidic ore: water = 1: 0.87 : 5.

The thus-prepared suspension is continuously delivered into an autoclave with a simultaneous delivery of air. The oxidative leaching is conducted under the following conditions: a partial pressure of oxygen 2.5 atm, and a temperature of 165°C. The process is continued for 9 hours. The prepared reaction mixture consists of liquid and solid phases. The precipitate is separated from the reaction mixture by filtration. The filtrate, which is a solution of sulphates of copper and manganese, contains 46.8 g/litre of copper and 69.3 g/litre of manganese. The recovery of copper and manganese from the starting materials is 96 and 99 percent, respectively.

The said solution is delivered into an autoclave where copper is reduced from copper sulphate by hydrogen. The process specifications are as follows: temperature, 170°C, total pressure, 35 atm. Copper is isolated from the prepared reaction mixture by filtration. The yield of copper is 97 percent. The total yield of the process is 96 percent.

The filtrate is separated from admixtures of copper by manganese sulphide. The copper sulphide formed is separated from the reaction mixture by filtration and is returned to the stage of oxidative leaching.

The neutralization of sulphuric acid contained in the solution of manganese sulphate is done by carbonate manganese ore at a temperature of 80°C with a continuous air bubbling through the reaction mixture.

The precipitate is separated from the thus-prepared reaction mixture by filtration, while the solution of manganese sulphate is evaporated and crystallized. The yield of manganese sulphate is 1.32 kg (as anhydrous sulphate) per kg of the starting copper concentrate. The recovery of manganese is 96 percent.

EXAMPLE 2

The process is conducted under conditions similar to those as described in Example 1, except that manganese carbonate ore containing 20.6 percent of manganese and 3.4 percent of calcium carbonate is taken as the manganese-containing raw material. The starting components are taken in the following ratio (by weight): copper concentrate:manganese carbonate ore: water = 1:1.5:5. The components are ground to a particle size of 74 mcm. The specifications of the oxidative leaching are as follows: temperature 175°C, a partial pressure of oxygen 15 atm, and the length of the process 3.5 hours. The solution of sulphates of copper and manganese contains 47.8 g/litre of copper and 59.3 g/litre of manganese. The recovery of copper from the starting stock is 98 percent. The specifications of the process of copper reduction with hydrogen are: temperature 180°C, a total pressure of hydrogen 40 atm.; the total output of copper is 98 percent. The neutralization of sulphuric acid is effected by manganese oxide ore reduced preliminarily by roasting. The yield of manganese sulphate, calculated with reference to the anhydrous product, is 1.2 kg per kg of the copper concentrate load. Extraction of manganese is 96 percent.

EXAMPLE 3

The process is conducted under the same conditions as described in Example 1, except that the chalcopyrite concentrate contains 16 percent of copper and 28.2 percent of manganese, and the flotation concentrate contains 23.4 percent of manganese oxide and 3.6 percent of calcium oxide. The components are ground to a particle size of 74 mcm. The weight ratio of the components is as follows: 1:1.1:5. The specifications of the oxidative leaching are as follows: temperature 185°C, partial pressure of oxygen 7.5 atm., and the length of the process is 5.5 hours. The prepared solution of copper sulphate and manganese sulphate contains 31 g/litre of copper and 51.1 g/litre of manganese. The extraction of copper (with respect to its starting quantity) is 97 percent.

The neutralization of sulphuric acid is carried out by a preliminarily reduced manganese oxide flotation concentrate. The yield of manganese sulphate, calculated with reference to the anhydrous product, is 0.87 kg per kg of the loaded copper concentrate. The extraction of manganese is 96 percent.

EXAMPLE 4

The process is carried out under the same conditions as in Example 1, except that the chalcopyrite concentrate containing 10 percent of copper and 16.2 percent of sulphur, manganese oxide flotation concentrate containing 33.2 percent of manganese and 4.8 percent of calcium oxide, and water are taken at the weight ratio of 1:0.44:5. The filtrate obtained after filtering is a solution of sulphates of copper and manganese. It contains 19.2 g/litre of copper and 29 g/litre of manganese. The extraction of copper, calculated with reference to the starting quantity, is 96 percent. The yield of manganese sulphate, calculated as the anhydrous product, is 0.44 kg per kg of the loaded copper concentrate. The extraction of manganese is 96 percent.

EXAMPLE 5

The process is carried out under the conditions similar to those described in Example 1, except that the manganese oxide ore containing 11.8 percent of manganese and 5.2 percent of calcium oxide is used as the manganese-containing raw material. The components are taken in the weight ratio of 1:2.0:7.5. The filtrate obtained after filtration is a solution of sulphates of copper and manganese, it contains 31.3 g/litre of copper and 30.6 g/litre of manganese. The extraction of copper is 96 percent.

The yield of manganese sulphate, with reference to the anhydrous product, is 1.05 kg per kg of the loaded copper concentrate. The extraction of manganese is 96 percent.

EXAMPLE 6

The process is carried out under the same conditions as described in Example 1, except that the manganese carbonate ore containing 11.8 percent of manganese is used as the manganese-containing raw material. The components are taken in the weight ratio of 1:3:10. The solution of the sulphates of copper and manganese obtained contains 23.4 g/litre of copper and 35.4 g/litre of manganese. The extraction of copper from the starting quantity is 96 percent.

The yield of manganese sulphate, with reference to the anhydrous product, is 1.53 kg per kg of the loaded concentrate. The extraction of manganese is 98 percent.

What is claimed is:

1. A method of preparing copper together with manganese sulphate comprising suspending a chalcopyrite concentrate and a manganese-containing raw material selected from the group consisting of manganese ore and manganese flotation concentrate in water, maintaining the resulting suspension with an oxygen-containing atmosphere at a temperature of 165°–185°C and a partial pressure of oxygen of 2.5–15 atm to thereby form a reaction mixture containing an aqueous solution of sulphates of copper and manganese, separating said solution from the reaction mixture, precipitating copper from the solution by reducing the copper sulphate with hydrogen at a temperature of 160°–180°C and a pressure of 30–40 atm whereby a portion of the copper remains in solution, separating the precipitated copper from the solution of manganese sulphate and sulphuric acid formed as a result of the copper reduction, purifying the solution from the admixture of the remaining copper by adding manganese sulphide to thereby form copper sulphide, separating the formed precipitate of copper sulphide, returning the copper sulphide to the stage of oxidative leaching, neutralizing the sulphuric acid by treating the solution with a manganese-containing raw material, isolating the solution of manganese sulphate, evaporating the solution and crystallizing the product.

2. A method according to claim 1, in which the manganese-containing raw material used for the neutralization of sulphuric acid is oxidic manganese-containing raw material, said method further comprising first reducing said raw material by roasting.

3. A method according to claim 1, in which the neutralization of sulphuric acid is carried out at a temperature of about 80°C while continuously bubbling air through the reaction mixture.

4. A method according to claim 2, in which the neutralization of sulphuric acid is carried out at a temperature of about 80°C while continuously bubbling air through the reaction mixture.

* * * * *